(12) United States Patent
Shoa et al.

(10) Patent No.: US 11,705,134 B2
(45) Date of Patent: *Jul. 18, 2023

(54) GRAPH-BASED APPROACH FOR VOICE AUTHENTICATION

(71) Applicant: NICE LTD., Ra'anana (IL)

(72) Inventors: Alon Menahem Shoa, Tel Aviv-Jaffa (IL); Roman Frenkel, Ashdod (IL); Tamir Caspi, Rehovot (IL)

(73) Assignee: NICE LTD., Ra'anana (IL)

( * ) Notice: Subject to any disclaimer, the term of this patent is extended or adjusted under 35 U.S.C. 154(b) by 222 days.

This patent is subject to a terminal disclaimer.

(21) Appl. No.: 17/314,176

(22) Filed: May 7, 2021

(65) Prior Publication Data

US 2021/0264922 A1 Aug. 26, 2021

Related U.S. Application Data

(63) Continuation of application No. 16/453,497, filed on Jun. 26, 2019, now Pat. No. 11,031,016.

(51) Int. Cl.
*G10L 17/00* (2013.01)
*G10L 17/06* (2013.01)

(52) U.S. Cl.
CPC .............. *G10L 17/00* (2013.01); *G10L 17/06* (2013.01)

(58) Field of Classification Search
CPC ... G10L 15/22; G10L 15/32; G10L 2015/088; G10L 15/08; G10L 2015/223; G10L 2015/227; H04R 1/326; H04R 1/34; H04R 1/40; H04R 1/32; H04R 3/02; H04R 29/007; H04R 27/00; H04R 2227/005; H04R 2430/01
See application file for complete search history.

(56) References Cited

U.S. PATENT DOCUMENTS

| | | | |
|---|---|---|---|
| 6,510,221 B1 * | 1/2003 | Fisher | H04M 3/5233 379/266.03 |
| 2015/0256675 A1 * | 9/2015 | Sri | H04M 3/5183 379/265.09 |
| 2016/0065741 A1 * | 3/2016 | Mezhibovsky | G06Q 30/016 379/265.12 |
| 2017/0013131 A1 * | 1/2017 | Craib | G06Q 30/016 |
| 2018/0131811 A1 * | 5/2018 | Buehler | H04M 3/5233 |
| 2018/0278750 A1 * | 9/2018 | Avila | H04L 51/02 |
| 2020/0411010 A1 | 12/2020 | Shoa et al. | |

* cited by examiner

*Primary Examiner* — Huyen X Vo
(74) *Attorney, Agent, or Firm* — Haynes and Boone, LLP

(57) ABSTRACT

Methods for voice authentication include receiving a plurality of mono telephonic interactions between customers and agents; creating a mapping of the plurality of mono telephonic interactions that illustrates which agent interacted with which customer in each of the interactions; determining how many agents each customer interacted with; identifying one or more customers an agent has interacted with that have the fewest interactions with other agents; and selecting a predetermined number of interactions of the agent with each of the identified customers. In some embodiments, the methods further include creating a voice print from first and second speaker components of each interaction; comparing the voice prints of a first selected interaction to the voice prints from a second selected interaction; calculating a similarity score between the voice prints; aggregating scores; and identifying the voice prints that are associated with the agent.

20 Claims, 6 Drawing Sheets

GRAPH-BASED APPROACH FOR VOICE AUTHENTICATION

CROSS-REFERENCE TO RELATED APPLICATIONS

This application is a continuation of U.S. patent application Ser. No. 16/453,497, filed Jun. 26, 2019, now allowed, which is incorporated herein in its entirety by express reference thereto.

TECHNICAL FIELD

The present disclosure relates generally to authenticating individuals using voice biometrics, and more specifically to a system and method for a more organized and accurate process to select and use mono telephonic interactions for individual or speaker enrollment and authentication.

BACKGROUND

Large organizations, such as commercial organizations, financial institutions, government agencies or public safety organizations conduct communication sessions, also known as interactions, with individuals such as customers, suppliers and the like on a daily basis.

Communication sessions between parties may involve exchanging sensitive information, for example, financial data, transactions and personal medical data. Thus, in communication sessions with individuals, it may be necessary to authenticate the individual, for example before offering the individual any information or services. When a communication session begins, a system or agent on behalf of one party may first identify the individual. Some organizations use voice prints to authenticate the identity of individuals.

The term "voice print" as used herein encompasses voice biometric data. Voice prints are also known by various other names including but not limited to spectrograms, spectral waterfalls, sonograms, and voicegrams. Voice prints may take many forms and may indicate both physical and behavioral characteristics of an individual. One type of voice print is in the form of time-varying spectral representations of sounds or voices. Voice prints may be in digital form and may be created from any digital audio recordings of voices, for example but not limited to audio recordings of communication sessions between call center agents and customers. A voice print can be generated in many ways known to those of ordinary skill in the art including but not limited to applying short-time Fourier transform (STFT) on various (preferably overlapping) audio streams of a particular voice such as an audio recording. For example, each stream may be a segment or fraction of a complete communication session or corresponding recording. A three-dimensional image of the voice print may present measurements of magnitude versus frequency for a specific moment in time.

An individual or speaker's voice may be extremely difficult to forge for biometric comparison purposes, since a myriad of qualities may be measured, ranging from dialect and speaking style to pitch, spectral magnitudes, and formant frequencies. The vibration of an individual's vocal chords and the patterns created by the physical components resulting in human speech are as distinctive as fingerprints. Depending on how they are created, voice prints of two individuals may differ from each other at about one hundred (100) different points.

Accurate individual (both customer and agent) enrollment is important in the creation of voice prints and the authentication process. Typically, a system will receive thousands of customer-agent interactions, with no organized way of determining which interactions should be used for agent enrollment, customer enrollment, and customer authentication.

Accordingly, a need exists for improved methods and systems for enrolling agents and customers in voice print databases.

DETAILED DESCRIPTION

Figure 1:
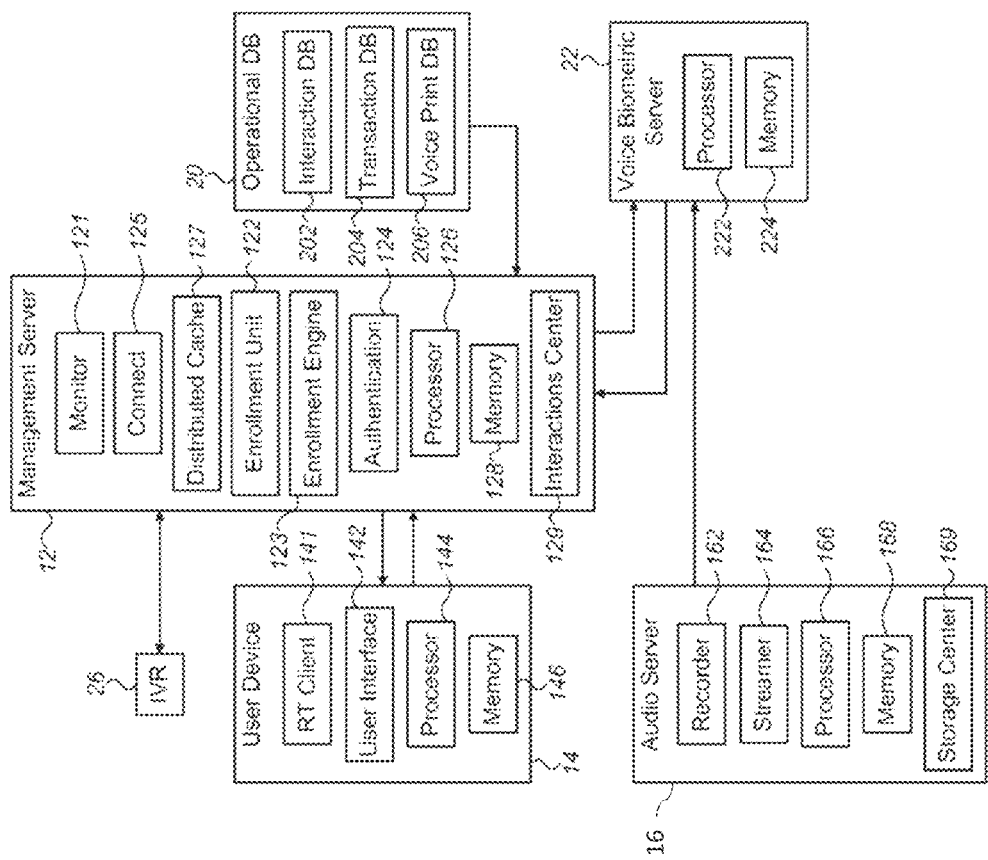
FIG. 1 is a high-level block diagram of an exemplary system for authenticating and enrolling speakers according to some embodiments of the present disclosure.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The systems and methods described herein provide for more accurate individual (e.g., agent and customer) enrollment in a voice print database, which in turn leads to improved (e.g., more accurate) voice authentication results. In particular, the present disclosure describes a more accurate approach to deciding which interactions to use for enrollment and authentication, and a more accurate approach to using the interactions for improved agent enrollment. Improved agent enrollment results in more accurate customer enrollment (e.g., by facilitating the identification of the customer in a customer-agent interaction). More accurate customer enrollment, in turn, leads to improved customer authentication.

In contrast to conventional systems and methods where selection of interactions is random, the present disclosure describes optimized decision making regarding which interactions to select for enrollment and authentication. In particular, a graph or a mapping is created to illustrate which agents interacted with which customers in a plurality of interactions. Next, how many agents each customer interacted with is determined and the customers having the fewest number of interactions with agents are identified. From these identified customers, a certain number of interactions (e.g., 8) with a single agent are selected. Interactions with customers who are not identified, but who interacted with the agent (e.g., customers having a larger number of interactions with other agents) can be used for customer enrollment. All other interactions can be used for customer authentication.

Each of the selected interactions (e.g., 8 interactions) are then separated into first and second speaker components. Voice prints are created for the first speaker component and the second speaker component. Next, the voice print from the first speaker component is compared to the voice prints of first and second speaker components in the other selected interactions to provide a plurality of scores that indicate a similarity between the voice prints. The comparisons define an analytical path through the selected interactions, and the scores for each analytical path are combined or aggregated. The analytical path having the highest aggregated score is identified as being associated with the agent. A voice print of the agent can then be created from all of the voice prints in the identified path. This agent voice print can subsequently be used in the creation and enrollment of a customer voice print as described in more detail below.

Reference is now made to FIG. 1, which is a high-level block diagram of a system for performing any of generating voice prints, authenticating individuals, and enrolling individuals in accordance with some embodiments of the present disclosure. At least some of the components of the system illustrated in FIG. 1 may for example be implemented in a call center environment. As used herein "call center," otherwise known as a "contact center" may include any platform that enables two or more parties to conduct a communication session. For example, a call center may include one or more user devices that may be operated by human agents or one or more IVR units, either of which may be used to conduct a communication session with an individual.

The system may include a plurality of user devices 14 (only one is shown) that may for example be operated by agents of a call center during, before and after engaging in a communication session with an individual, one or more audio servers 16 (only one is shown) to record communication sessions, a management server 12 configured to control the enrollment and/or authentication processes, an operational database 20 that includes data related to individuals and communication sessions, a voice biometric server 22 configured to generate voice prints of the individuals (e.g., agent and customer), and an IVR unit 26.

According to some embodiments, the management server 12 is configured to make optimal decisions regarding interactions selected for agent enrollment, customer enrollment, and customer authentication and to facilitate improved agent enrollment, as will be described in more detail below.

It should be noted that the various servers shown in FIG. 1 may be implemented on a single computing device according to embodiments of the invention. Equally, the functions of any of the servers may be distributed across multiple computing devices. In particular, the voice biometric functions need not be performed on servers. For example, they may be performed in suitably programmed processors or processing modules within any computing device.

Management server 12 may receive information from any of user device 14, from IVR unit 26, from operational database 20 and from voice biometric server 22. Voice biometric server 22 may generate voice prints from audio streams received from audio server 16 or from management server 12. Any of audio server 16, IVR unit 26 and user device 14 may be included in a call center or contact center for conducting and recording communication sessions. According to some embodiments, management server 12 may serve the function of an applications server.

During a communication session, management server 12 may receive from user device 14 or IVR unit 26 a request to authenticate an individual. After performing the authentication and while the communication session still proceeds, management server 12 may send a notification to the user device 14 or the IVR unit 26, confirming whether or not the individual was successfully authenticated. Further, according to some embodiments, management server 12 may perform passive (seamless) authentication of individuals and control enrollment of voice prints.

Management server 12 may include an enrollment unit 122, which may also be referred to as an enrollment server, configured to control the enrollment process of new voice prints according to enrollment logic. Management server 12 may further include an enrollment engine 123 that may include a module responsible for managing (e.g. collecting and dispatching) enrollment requests and "feeding" the enrollment unit. Management server 12 may further include an authentication unit 124, which may also be referred to as an authentication server or an authentication manager, to control automatic and seamless authentication of the individual during the communication session.

Management server 12 may further include at least one processor 126 and at least one memory unit 128. Processor 126 may be any computer, processor or controller configured to execute commands included in a software program, for example to execute the methods disclosed herein. Enrollment manager 122 and authentication server 124 may each include or may each be in communication with processor 126. Alternatively, a single processor 126 may perform both the authentication and enrollment methods. Processor 126 may include components such as, but not limited to, one or more central processing units (CPU) or any other suitable multi-purpose or specific processors or controllers, one or more input units, one or more output units, one or more memory units, and one or more storage units. Processor 126 may additionally include other suitable hardware components and/or software components.

Memory 128 may store codes to be executed by processor 126. Memory 128 may be in communication with or may be included in processor 126. Memory 128 may include a mass storage device, for example an optical storage device such as a CD, a DVD, or a laser disk; a magnetic storage device such as a tape, a hard disk, Storage Area Network (SAN), a Network Attached Storage (NAS), or others.

According to some embodiments, management server 12 also includes monitor 121 configured to listen for events and to dispatch them to other components of the system subscribing to monitor 121, such as a client operating on a user device 14 or in IVR unit 26.

According to various embodiments, management server 12 additionally includes a connect module 125 including a distributed cache 127, which in some embodiments may be part of memory 128. The connect module 125 is configured to connect real-time (RT) clients operating on user devices such as user device 14 or IVR unit 26 with backend components of the system such as the operational database 20 and the voice biometric server 22. The distributed cache 127 may include an in-memory database, used for fast data fetching in response to queries, e.g. from a user device 14 or IVR unit 26.

According to several embodiments, management server 12 additionally includes an interaction center 129. The functions of the interaction center 129 include managing the recording of interactions. For example, the interactions center may be a module that, for example during a telephone call, interacts with the telephony switch or packet branch exchange (PBX, not shown in FIG. 1) and computer telephony integration (CTI, not shown in FIG. 1) of an individual communicating with the user of a user device 14 to obtain start and/or end of call events, metadata and audio streaming. The interaction center 129 may extract events from a call sequence and translate or convert them for storage, indexing and possibly other operations in a backend system such as operational database 20.

User device 14 may for example be operated by an agent within a contact center. For example, user device 14 may include a desktop or laptop computer in communication with the management server 12 for example via any kind of communications network. User device 14 may include a user interface 142, a processor 144 and a memory 146. User interface 142 may include any device that allows a human user to communicate with the processor 144. User interface 142 may include a display, a Graphical User Interface (GUI), a mouse, a keyboard, a microphone, an earphone and other devices that may allow the user to upload information to processor 144 and receive information from processor 144. Processor 144 may include or may be in communication with memory 146 that may include codes or instructions to be executed by processor 144.

According to various embodiments, user device 14 further includes a real-time client 141 which may take the form of client software running on a desktop for example associated with an agent at user device 14. The real-time client 141 may be configured to "listen" to events and extract information from applications running on the desktop.

Similarly, in some communication sessions, the IVR unit 26 may perform some of the functions of user device 14 and therefore the IVR unit 26 may also include a real-time client performing the same functions as the real-time client 141.

During a communication session, user device 14 or IVR unit 26 may receive identification information from an individual, for example, the name of the individual, a customer number associated with the individual, an ID number and/or a social security number. Additionally or alternatively, user device 14 or IVR unit 26 may receive identification information related to the individual automatically from details related to the "call," for example, the telephone number from which the individual calls, or the area (PIN code) from which the individual calls. An operator of user device 14 may use user interface 144 to upload and receive information related to the identity of the individual from database 20 via management server 12. Similarly an IVR unit may retrieve such information. The individual may be asked so called know your customer "KYC" questions related to data stored in database 20. For example, the individual may be asked to provide personal details (e.g., credit card number, and/or the name of his pet) or to describe the latest actions performed (e.g., financial transactions). During the communication session, an audio segment or an audio stream may be recorded and stored in audio server 16.

Audio server 16 may include an audio recorder 162 to record the individual's voice, an audio streamer 164 to stream the recorded voice, a processor 166 to control the recording, streaming and storing of the audio stream, and a memory 168 to store code to be executed by the processor. Audio recorder 162 may include any components configured to record an audio segment (a voice of an individual) of the communication session. Processor 166 may instruct audio streamer 164 to receive audio segment from recorder 162 and stream the segment into audio streams or buffers. Audio server 16 may further include, or may be in communication with, any storage unit(s) for storing the audio stream, e.g., in an audio archives. The audio archives may include audio data (e.g., audio streams) of historical communication sessions.

Audio server 16 may, according to some embodiments, include storage center 169 configured to store historical and ongoing speech and calls of individuals, for example but not limited to calls between individuals and IVR unit 26.

Operational database 20 may include one or more databases, for example, at least one of an interaction database 202, a transaction database 204 and a voice print database 206 (e.g., an agent voice print database and/or a customer voice print database). Interaction database 202 may store non-transactional information of individuals, such as home address, name, and work history related to individuals such as customers of a company on whose behalf a call center is operating. Voice prints for individuals may also be stored in the interaction database 202 or in a separate voice print database 206. Such non-transactional information may be provided by an individual, e.g., when opening a bank account. Furthermore, database 202 may store interaction information related to previous communication sessions conducted with the individual, such as but not limited to the time and date of the session, the duration of the session, information acquired from the individual during the session (e.g., authentication information, successful/unsuccessful authentication). Applications used in a system according to some embodiments may also be stored in operational database 20.

Transaction database 204 may include transactional information related to previous actions performed by the individual, such as actions performed by the individual (e.g., money transfer, account balance check, order checks books, order goods and services or get medical information). Each of databases 202 and 204 may include one or more storage units. In an exemplary embodiment, interaction database 202 may include data related to the technical aspects of the communication sessions (e.g., the time, date and duration of the session), a Customer relation management (CRM) database that stores personal details related to individuals or both. In some embodiments, interaction database 202 and transaction database 204 may be included in a single database. Databases 202 and 204 included in operational database 20 may include one or more mass storage devices. The storage device may be located onsite where the audio segments or some of them are captured, or in a remote location. The capturing or the storage components can serve one or more sites of a multi-site organization.

Audio or voice recordings recorded, streamed and stored in audio server 16 may be processed by voice biometric server 22. Voice biometric server 22 may include one or more processors 222 and one or more memories 224. Processor 222 may include or may control any voice biometric engine known in the art, for example, the voice biometric engine by Nuance Inc. to generate a voice print (e.g., voice biometric data) of at least one audio stream received from audio server 16. The voice print may include one or more parameters associated with the voice of the individual. Processor 222 may include or may control any platform known in the art, for example the platform by Nuance Inc. USA, for processing (e.g., identifying and comparing) voice prints generated from two or more audio streams. When an audio stream associated with an individual is a candidate for enrollment, voice biometric server 22 may receive from management server 12 verification of the identity of the individual. Following the verification, voice biometric server 22 may generate a voice print of the audio stream related to the individual. Processor 222 may further be configured to compare the generated voice print to other voice prints previously enrolled and stored, for example, in one or more storage units associated with voice biometric server 22. The storage units associated with voice biometric server 22 may include voice prints stored at a potential fraudster list (i.e., watch list, black list, etc.), voice prints related to the individual that were enrolled following previous communication sessions with the individual, and/or voice prints related or associated with other individuals. Memory 224 may include codes or instructions to be executed by processor 222. In some embodiments, memories 146, 168 or 224 may include the same elements disclosed with respect to memory 128.

Optimal Decision Making on Enrollment and Authentication

Figure 2A:
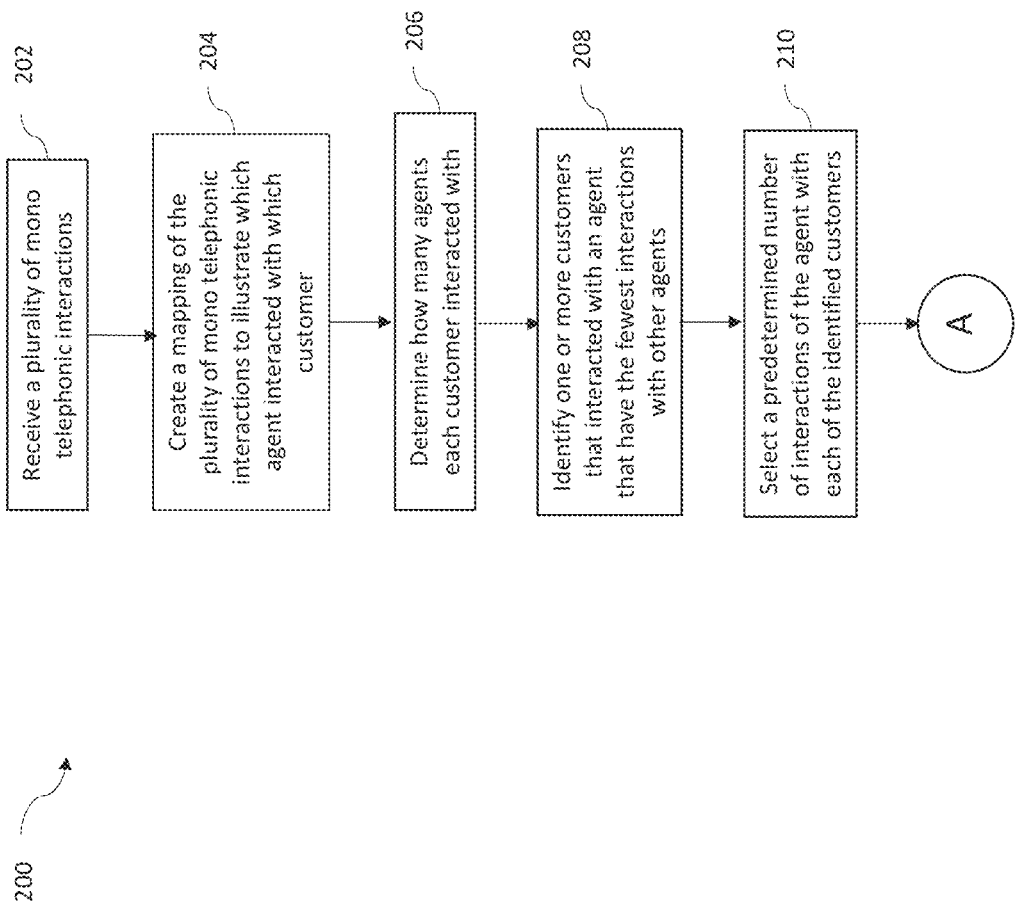
FIG. 2A is a flowchart of the first part of a method according to embodiments of the present disclosure.
Figure 3A:
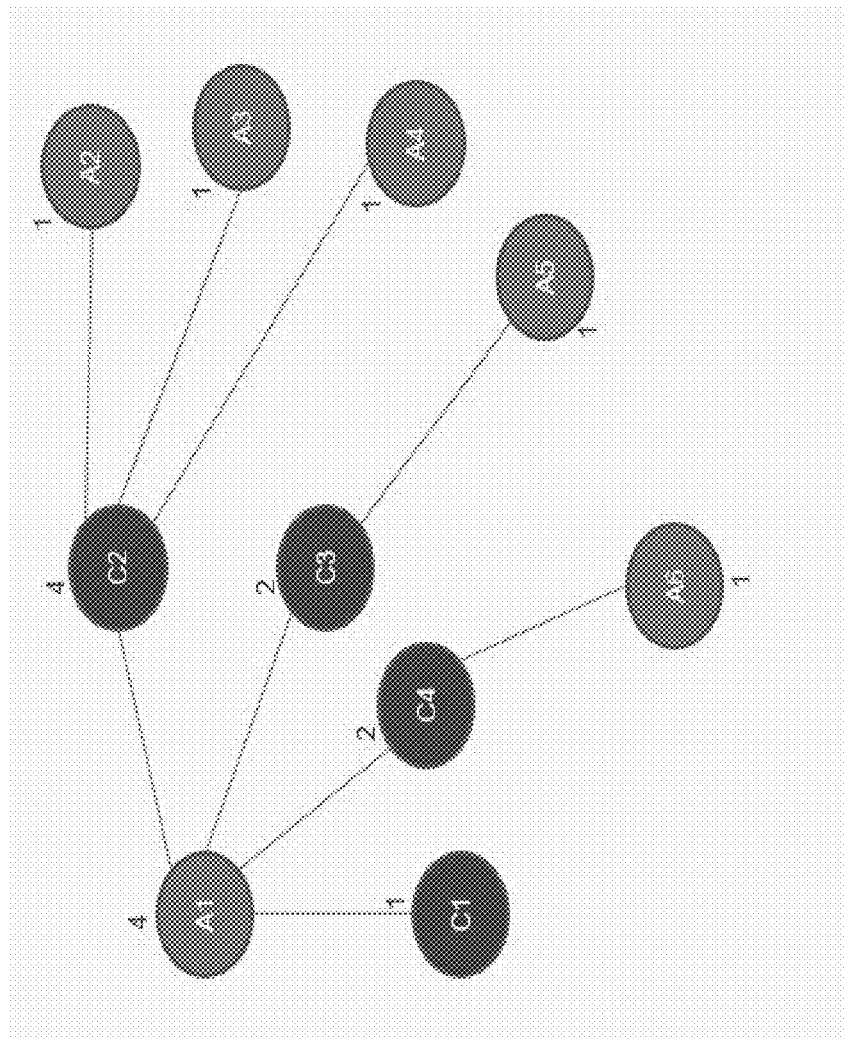
FIG. 3A is an exemplary graph or mapping that illustrates the different interactions between customers and agents.

Referring now to FIGS. 2A and 3A, a method 200 is described. At step 202, management server 12 receives a plurality of mono telephonic interactions that includes both customer and agent voices. For example, management server 12 may receive the interactions from operational database 20. By "mono" is meant particularly that separate channels are not used to record the agent and the customer sides of the communication. A mono recording is a recording that is done on one single channel. In a mono recording, a single audio stream can contain the two sides of the call or interaction.

At step 204, the management server 12 creates a graph or a mapping of the plurality of the mono telephonic interactions to illustrate which agent interacted with which customer in each of the interactions. For example, as shown in FIG. 3A, a mapping 300 is shown that maps or connects different agents A1-A6 with different customers C1-C4. Focusing on agent A1, the mapping 300 shows that agent A1 communicated or interacted with customers C1-C4.

At step 206, management server 12 determines how many agents each customer interacted with. Referring to FIG. 3A, customer C1 interacted only with agent A1; customer C2 interacted with agents A1-A4; customer C3 interacted with agent A1 and agent A5; and customer C4 interacted with agent A1 and agent A6. Therefore, customer C1 interacted with a total of 1 agent; customer C2 interacted with a total of 4 agents; customer C3 interacted with a total of 2 agents; and customer C4 interacted with a total of 2 agents.

Figure 3B:
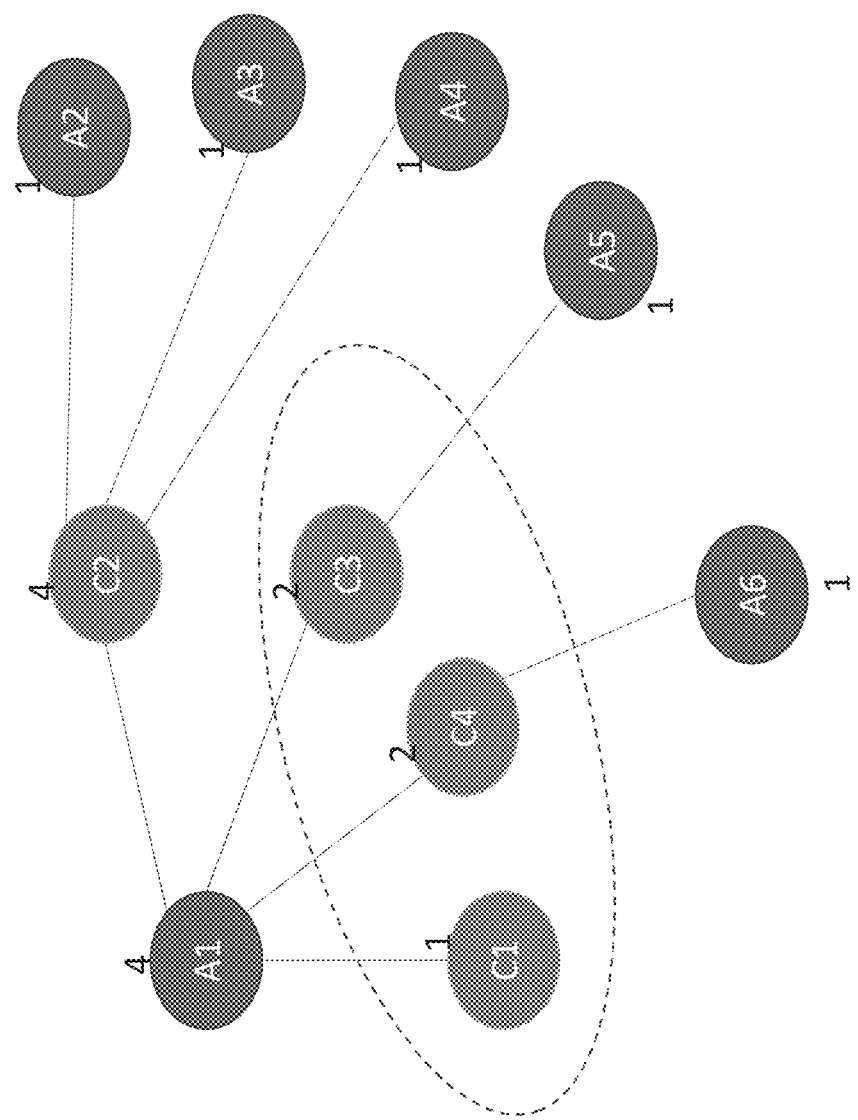
FIG. 3B is the exemplary graph or mapping of FIG. 3A that shows selection of the customers having the fewest interactions.

At step 208, management server 12 identifies one or more customers an agent has interacted with that have the fewest interactions with other agents based on step 206. Referring now to FIG. 3B, and selecting agent A1 as the agent of interest, management server 12 identifies customer C1, C3, and C4 as the customers having the fewest interactions with agents other than agent A1. Customer C2 interacted with agent A1, but also interacted with agents A2-A4. Interactions of customer C2 with agent A1 are not used for agent enrollment, but may be used for customer enrollment in a customer voice print database.

At step 210, management server 12 selects a predetermined number of interactions of the agent A1 with each of the identified customers C1, C3, and C4. For example, a total of 8 interactions of agent A1 with customers C1, C3, and C4 may be selected, although any number is suitable. For purposes of clarity, the remainder of the method 200 and FIG. 4 will be explained assuming 8 interactions were selected.

Improved Agent Enrollment Flow

Figure 2B:
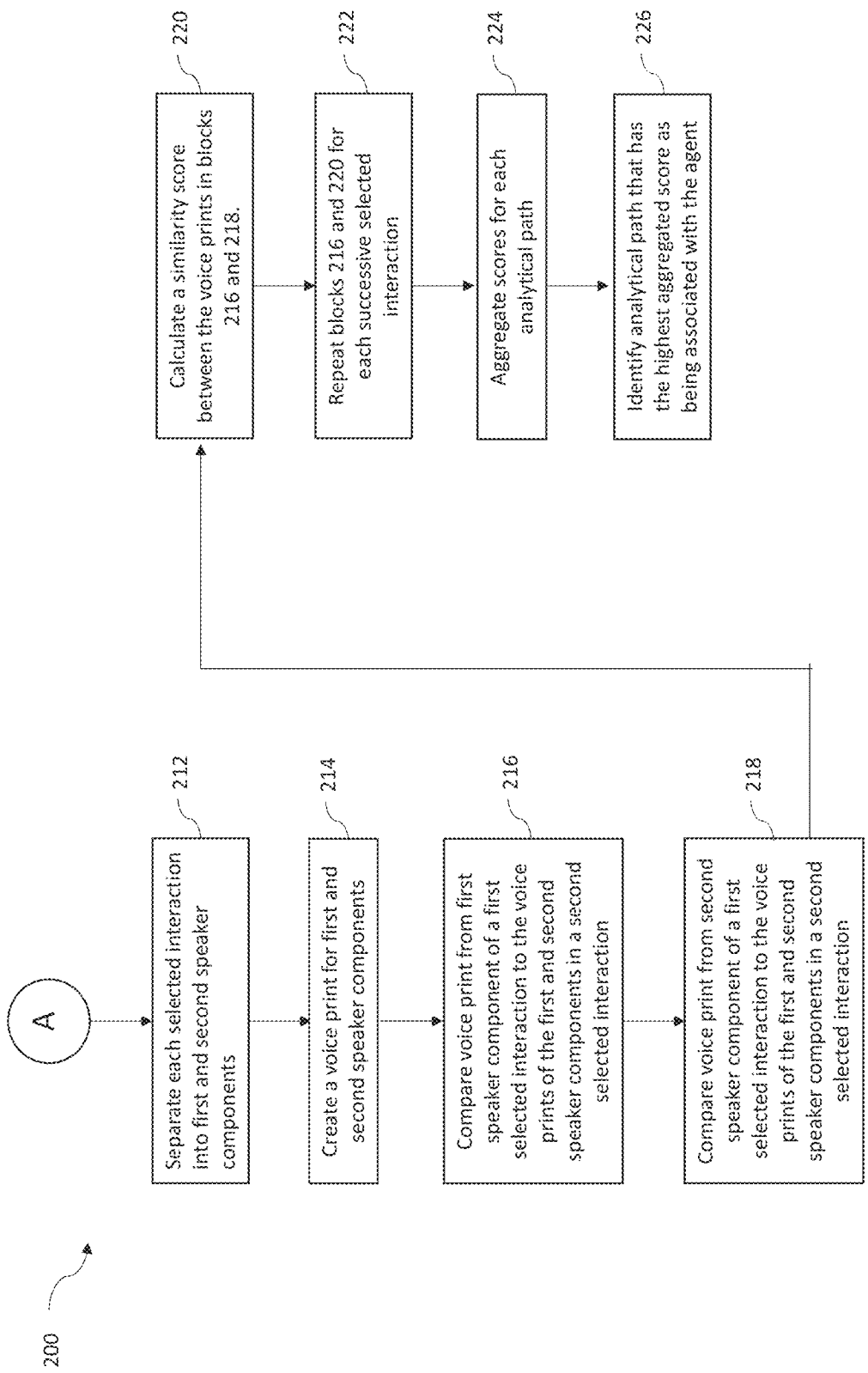
FIG. 2B is a flowchart of the second part of the method according to embodiments of the present disclosure.
Figure 4:
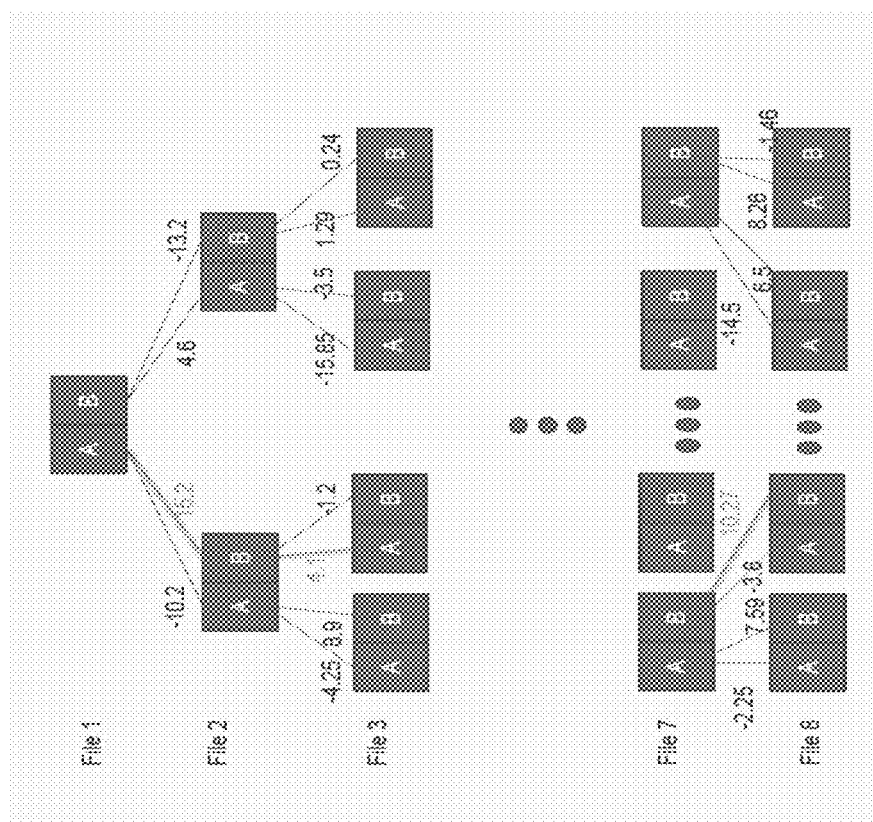
FIG. 4 is a diagram that illustrates how selected interactions are analyzed to determine which individual or speaker is an agent.

Referring now to FIGS. 2B and 4, at step 212, management server 12 separates each selected interaction into a first speaker component and a second speaker component. For example, as shown in FIG. 4, a total of 8 interactions (File 1-File 8) are selected and divided into two parts A and B. It is unknown who is speaker A and who is speaker B.

At step 214, voice biometric server 22 creates a voice print from the first speaker component and a voice print from the second speaker component. For example, voice biometric server 22 creates a voice print from first speaker component A (voice print A) and a voice print from second speaker component B (voice print B).

At step 216, management server 12 compares the voice print from the first speaker component of a first selected interaction to (1) the voice print from the first speaker component of a second selected interaction and (2) the voice print from the second speaker component of the second selected interaction. As seen in FIG. 4, voice print A in File 1 is compared to voice print A in File 2 and voice print B in File 2.

At step 218, management server 12 compares the voice print from the second speaker component of a first selected interaction to (1) the voice print from the first speaker component of a second selected interaction and (2) the voice print from the second speaker component of the second selected interaction. In FIG. 4, voice print B in File 1 is compared to voice print A in File 2 and voice print B in File 2.

At step 220, management server 12 calculates a score indicating the similarity between the voice prints in steps 216 and 218. Referring again to FIG. 4, the similarity score between voice print A in File 1 to voice print A in File 2 is −10.2, while the similarity score between voice print A in File 1 to voice print B in File 2 is 15.2. The scores indicate that voice print A in File 1 is more similar to voice print B in File 2 than voice print A in File 2. The similarity score of voice print B in File 1 to voice print A in File 2 is 4.6, while the similarity score between voice print B in File 1 to voice print B in File 2 is −13.2. The scores indicate that voice print B in File 1 is more similar to voice print A in file 2 than voice print B in file 2.

At step 222, management server 12 repeats steps 216-220 for each successive selected interaction. As seen in FIG. 4, voice print A in File 2 is compared to voice print A in File 3 and voice print B in File 3. Voice print B in File 2 is compared to voice print A in File 3 and voice print B in File 3.

Each comparison yields a similarity score that defines an analytical path through the selected interactions. For example, the comparison of voice print A in File 1 to voice prints A and B in File 2 yields 2 similarity scores, each defining a path through the selected interactions. The first path provides a score of −10.2 and the second path provides a score of 15.2. Following the first path, voice print A in File 2 is compared to (1) voice print A in File 3 to yield a score of −4.25 and (2) voice print B in File 3 to yield a score of 8.9. Following the second path from voice print A in File 1, voice print B in File 2 in compared to (1) voice A in File 3 to yield a score of 4.1 and (2) voice print B in File 3 to yield a score of −1.2.

Similarly, the comparison of voice print B in File 1 to voice prints A and B in File 2 yields 2 similarity scores, each defining a path through the selected interactions. The first path provides a score of 4.6 and the second path provides a score of −13.2. Following the first path, voice print A in File 2 is compared to (1) voice print A in File 3 to yield a score of −15.85 and (2) voice print B in File 3 to yield a score of −3.5. Following the second path from voice print B in File 1, voice print B in File 2 is compared to (1) voice print A in File 3 to yield a score of 1.29 and (2) voice print B in File 3 to yield a score of 0.24. The comparing and scoring is repeated until the last interaction, which is File 8 in this particular example, is reached.

At step 224, management server 12 aggregates the scores for each analytical path. For example, in FIG. 4, the aggregated scores starting from the comparison of voice print A in File 1 to voice prints A and B in File 2 include −10.2 and −4.25 in a first path, −10.2 and 8.9 in a second path, 15.2 and 4.1 in a third path, and 15.2 and −1.2 in a fourth path. The aggregated scores starting from the comparison of voice print B in File 1 to voice prints A and B in File 2 include 4.6 and −15.85 in a first path, 4.6 and −3.5 in a second path, −13.2 and 1.29 in a third path, and −13.2 and 0.24 in a fourth path.

At step 226, management server 12 identifies an analytical path through all of the selected interactions that has the highest aggregated score as being associated with the agent (e.g., agent A1). In FIG. 4, though not completely shown in detail, the path having the highest aggregated score is the path starting from the comparison of voice print A in File 1 to voice print B in File 2 that yields a score of 15.2, followed by the comparison of voice print B in File 2 to voice print A in File 3 that yields a score of 4.1. Thus, voice print A in File 1, voice print B in File 2, and voice print A in File 3 are identified as being voice prints of the agent (e.g., agent A1).

Uses of Agent Voice Print

Once the analytical path with the highest aggregated score is identified, the voice prints in that analytical path are taken, and voice biometric server 22 creates a voice print of the agent (e.g., agent A1) from those voice prints in the identified analytical path. The voice print of the agent can then be enrolled in an agent voice print database.

According to some embodiments, a subsequent mono telephonic interaction between the agent (e.g., agent A1) and a customer is received. Because the interaction is in mono format, the interaction is separated into a first speaker component and a second speaker component. The first speaker component and the second speaker component are then compared to the voice print of the agent to determine the identities of the first speaker and the second speaker.

In certain embodiments, once the comparison is made, the first speaker component is determined to be associated with the agent and the second speaker component is determined to be associated with the customer. The first speaker component can be used to create another voice print of the agent, or used for voice print enrichment of the agent.

The second speaker component can be used to create a customer voice print, which can then be enrolled in a customer voice print database. For example, voice biometric server 22 may include a voice print database to store all the enrolled voice prints associated with customers of a company. The voice print database may include lookup tables that include, for example, voice prints associated with names of customers, sorted alphabetically, or voice prints associated with ID numbers related to the customers sorted by numerical order. The enrolled voice prints may be stored for future use, for example, in an automatic authentication process.

The customer voice print may then be used to authenticate the customer on subsequent communications. The result of the enrollment process is the creation of a voice print for the customer. After enrollment, when an individual makes a call, his voice is compared to the stored voice print to authenticate the individual.

Techniques for authentication using voice prints are known in the art and will not be described further herein. The authentication may simply be regarded as checking similarity between a received customer voice print and the stored voice print. The authentication result, which may for example be simply positive or negative, e.g., in binary form, may be reported back from the voice biometric server 22 to the management server 12.

If the authentication result is negative, the result might be stored and reported as a possible instance of fraud. Such storage might be at operational database 20 and might be in association with other information relating to the customer whose identity and passcode was given, e.g., spoken, as part of the interaction. If the authentication result is positive, the received customer voice print may be saved in association with other information relating to the customer. The received voice print that led to the positive authentication may be used to enrich the voice print already stored. This enrichment may help to reduce the rate of false rejections or unsuccessful authentications from genuine authentication attempts. It may also help to ensure that the voice print is current which may be useful since the voice of an individual may change over time.

EXAMPLES

The present disclosure is further defined by reference to the following example, describing in detail a study used to enroll and authenticate individuals. This example is used for illustrative purposes only, and is not to be construed as limiting the appended claims.

The method 200 was used and was compared to the conventional (e.g., random) way of selecting interactions and enrolling agents. There were 1000 agents, 50,068 customers, and 69,485 interactions. Table 1 below provides the results.

TABLE 1

RESULTS

|  | Method of Present Disclosure | Conventional |
|---|---|---|
| Agent Enrollment | 1000 | 1000 |
| Customer Enrollment | 15,366 | 13,245 |
| Customer Authentication | 19,417 | 16,646 |

As can be seen, there was at least a 15% increase customer enrollment and a 16.6% increase in the number of customer authentications.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A voice biometric authentication system comprising:
a processor and a computer readable medium operably coupled thereto, the computer readable medium comprising a plurality of instructions stored in association therewith that are accessible to, and executable by, the processor, to perform operations which comprise:
(i) receiving a plurality of mono telephonic interactions between customers and agents;
(ii) determining how many agents each customer interacted with;
(iii) identifying one or more customers an agent has interacted with that have the fewest interactions with other agents;
(iv) selecting a predetermined number of interactions of the agent with each of the identified customers; and
(v) processing the selected predetermined number of interactions of the agent with each of the identified customers into voice prints.

2. The system of claim 1, wherein processing the selected predetermined number of interactions of the agent with each of the identified customers into voiceprints comprises:
separating each selected interaction into a first speaker component and a second speaker component; and
for each selected interaction, creating a voice print from the first speaker component and a voice print from the second speaker component; and
wherein the operations further comprise:
(vi) comparing the voice print from the first speaker component of a first selected interaction to (1) the voice print from the first speaker component of a second selected interaction and (2) the voice print from the second speaker component of the second selected interaction;
(vii) comparing the voice print from the second speaker component of the first selected interaction to (1) the voice print from the first speaker component of the second selected interaction and (2) the voice print from the second speaker component of the second selected interaction;
(viii) calculating a score indicating similarity between the voice prints in steps (vi) and (vii);
(xi) repeating steps (vi), (vii), and (viii) for each successive selected interaction, wherein the comparisons define an analytical path through the selected interactions;
(x) aggregating the scores for each analytical path; and
(xi) identifying an analytical path having the highest aggregated score as associated with the agent.

3. The system of claim 2, wherein the operations further comprise creating a voice print of the agent from the voice prints in the identified path.

4. The system of claim 3, wherein the operations further comprise receiving an additional mono telephonic interaction between the agent and a customer.

5. The system of claim 4, wherein the operations further comprise separating the received interaction into a first speaker component and a second speaker component.

6. The system of claim 5, wherein the operations further comprise comparing the first speaker component and the second speaker component to the voice print of the agent.

7. The system of claim 6, wherein the operations further comprise:
determining that the first speaker component is associated with the agent;
determining that the second speaker component is associated with the customer; and
enrolling the voice print of the agent in an agent voice print database.

8. The system of claim 7, wherein the operations further comprise:
creating a customer voice print from the second speaker component; and
enrolling the customer voice print in a customer voice print database.

9. The system of claim 8, wherein the operations further comprise authenticating a customer based on the enrolled customer voice print.

10. A method, which comprises:
(i) receiving a plurality of mono telephonic interactions between customers and agents;
(ii) determining how many agents each customer interacted with;
(iii) identifying one or more customers an agent has interacted with that have the fewest interactions with other agents;
(iv) selecting a predetermined number of interactions of the agent with each of the identified customers; and
(v) processing the selected predetermined number of interactions of the agent with each of the identified customers into voice prints.

11. The method of claim 10, wherein processing the selected predetermined number of interactions of the agent with each of the identified customers into voiceprints comprises:
separating each selected interaction into a first speaker component and a second speaker component; and
for each selected interaction, creating a voice print from the first speaker component and a voice print from the second speaker component; and
further comprising:
(vi) comparing the voice print from the first speaker component of a first selected interaction to (1) the voice print from the first speaker component of a second selected interaction and (2) the voice print from the second speaker component of the second selected interaction;
(vii) comparing the voice print from the second speaker component of the first selected interaction to (1) the voice print from the first speaker component of the second selected interaction and (2) the voice print from the second speaker component of the second selected interaction;
(viii) calculating a score indicating similarity between the comparisons in steps (vi) and (vii);
(ix) repeating steps (vi), (vii), and (viii) for each successive selected interaction, wherein the comparisons define an analytical path through the selected interactions;
(x) aggregating the scores for each analytical path; and
(xi) identifying an analytical path having the highest aggregated score as associated with the agent.

12. The method of claim 11, further comprising creating a voice print of the agent from the voice prints in the identified analytical path.

13. The method of claim 12, further comprising:
receiving an additional mono telephonic interaction between the agent and a customer; and
separating the received interaction into a first speaker component and a second speaker component.

14. The method of claim 13, further comprising comparing the first speaker component and the second speaker component to the voice print of the agent.

15. The method of claim 14, further comprising:
determining that the first speaker component is associated with the agent;
determining the second speaker component is associated with the customer; and
enrolling the voice print of the agent in an agent voice print database.

16. The method of claim 15, further comprising:
creating a customer voice print from the second speaker component;
enrolling the customer voice print in a customer voice print database; and
authenticating a customer based on the enrolled customer voice print.

17. A non-transitory computer-readable medium having stored thereon computer-readable instructions executable by a processor to perform operations which comprise:
   (i) receiving a plurality of mono telephonic interactions between customers and agents;
   (ii) determining how many agents each customer interacted with;
   (iii) identifying one or more customers an agent has interacted with that have the fewest interactions with other agents;
   (iv) selecting a predetermined number of interactions of the agent with each of the identified customers; and
   (v) processing the selected predetermined number of interactions of the agent with each of the identified customers into voice prints.

18. The non-transitory computer-readable medium of claim 17, wherein processing the selected predetermined number of interactions of the agent with each of the identified customers into voiceprints comprises:
   separating each selected interaction into a first speaker component and a second speaker component; and
   for each selected interaction, creating a voice print from the first speaker component and a voice print from the second speaker component; and wherein the operations further comprise:
   (vi) comparing the voice print from the first speaker component of a first selected interaction to (1) the voice print from the first speaker component of a second selected interaction and (2) the voice print from the second speaker component of the second selected interaction;
   (vii) comparing the voice print from the second speaker component of the first selected interaction to (1) the voice print from the first speaker component of the second selected interaction and (2) the voice print from the second speaker component of the second selected interaction;
   (viii) calculating a score indicating similarity between the comparisons in steps (vi) and (vii);
   (ix) repeating steps (vi), (vii), and (viii) for each successive selected interaction, wherein the comparisons define an analytical path through the selected interactions;
   (x) aggregating the scores for each path; and
   (xi) identifying a path having the highest aggregated score as associated with the agent.

19. The non-transitory computer-readable medium of claim 18, wherein the operations further comprise creating a voice print of the agent from the voice prints in the identified path.

20. The non-transitory computer-readable medium of claim 19, wherein the operations further comprise:
   receiving an additional mono telephonic interaction between the agent and a customer;
   separating the received interaction into a first speaker component and a second speaker component; and
   comparing the first speaker component and the second speaker component to the voice print of the agent.

* * * * *